United States Patent [19]
Banner et al.

[11] Patent Number: 5,090,108
[45] Date of Patent: Feb. 25, 1992

[54] STATOR COIL WINDING AND LEAD TERMINATION METHOD AND APPARATUS

[75] Inventors: Alvin C. Banner, Montgomery County; John W. Bradfute, Green County; Patrick A. Dolgas, Clermont County; Lawrence E. Newman, Tipp City, all of Ohio

[73] Assignee: Globe Products Inc., Huber Heights, Ohio

[21] Appl. No.: 598,878

[22] Filed: Oct. 17, 1990

[51] Int. Cl.$^5$ ............................................. H02K 15/00
[52] U.S. Cl. .................................... 29/596; 29/736; 29/506.1; 29/863
[58] Field of Search ............... 29/596, 566.1, 732, 29/735, 736, 564.5, 863

[56] References Cited

U.S. PATENT DOCUMENTS

| | | | |
|---|---|---|---|
| 3,747,187 | 7/1973 | Colwell | 29/203 D |
| 3,760,339 | 9/1973 | Marshall | 29/596 |
| 3,785,034 | 1/1974 | Bucholtz | 29/735 |
| 4,074,418 | 2/1978 | Pearsall | 29/596 |
| 4,428,113 | 1/1984 | Fischer et al. | 29/736 |
| 4,553,319 | 11/1985 | Fischer et al. | 29/596 |
| 4,951,379 | 8/1990 | Clemenz | 29/597 |
| 4,969,606 | 11/1990 | Santadorea et al. | 242/1.1 R |

FOREIGN PATENT DOCUMENTS

| | | |
|---|---|---|
| 0331906 | 9/1989 | European Pat. Off. |
| 2092029 | 8/1982 | United Kingdom |

Primary Examiner—P. W. Echols
Attorney, Agent, or Firm—Roger S. Dybvig

[57] ABSTRACT

Connection of stator coil lead wires to terminals with channels is accomplished using an industrial robot and tooling for guiding the lead wires into the terminal channels and for crimping the lead wire to the terminals before the wires are severed. Also, lead wire placing assemblies are provided with hooks at each end of a stator being wound for holding the start wires away from the stator pole pieces.

6 Claims, 10 Drawing Sheets

STATOR COIL WINDING AND LEAD TERMINATION METHOD AND APPARATUS

SUMMARY OF THE INVENTION

This invention relates to a stator coil winding and lead termination method and apparatus particularly intended for the manufacture of two-pole stators for universal electric motors. Although the invention is intended for use in the manufacture of electric motor stators, aspects of the invention may be useful in the manufacture of other electrical devices.

Two-pole stators for universal electric motors typically have a pair of coils comprising magnet wire having an insulating coating and wound around pole pieces formed on a laminated core. Each coil has two or more wire leads extending therefrom. A practice that has become commonplace in recent years is to mount terminals having wire-receiving channels on the stator cores adjacent the coils to which the coil leads are connected. One such terminal has a longitudinally-extending, U-shaped channel with sidewalls that are notched to form tabs at their outer ends. During manufacture, a coil lead wire is laid into the channel and the tabs crimped together around the lead wire to temporarily clamp the lead wire. At a later stage in the manufacturing process, the channels are rolled around the lead wires to permanently secure the lead wires to the terminals and the tabs are cut away from the remaining parts of the terminals along with any excess lengths of lead wires extending therefrom. When the channels are rolled around the lead wires, a high voltage is applied to the terminals to melt the insulation on the lead wires and burrs or the like on the insides of the channels pierce into the lead wires to create a good electrical conection between the lead wires and the terminals.

In preparation for connection of stator coil leads to terminals having U-shaped lead-receiving channels, each of the coil leads is cut during the coil winding process to a length sufficient that it can be held by a wire clamp near the wound stator in a position wherein it extends across the face of the stator adjacent its associated terminal so that it may be mechanically manipulated to be connected to the terminal. In order to achieve connection of a coil lead to a terminal, one practice has been to use a machine generally of the type shown in U.S. Pat. No. 3,747,187 having mechanisms to align the coil leads with the channels, to tamp the leads into the channels, and to crimp the sidewalls of the tabs against the lead wires. Such machines typically connect all four lead wires simultaneously. Excess lengths of the lead wire are cut away, usually at a different processing station, by a separate cutter mechanism in preparation for the presentation of the stator to the machine that permanently secure the lead wires to the terminals.

The wire handling and tab crimping mechanisms of the prior machines are fast-acting and reliable. However, each machine is dedicated to the manufacture of a stator of but one configuration. If it is desired to use the machine for manufacturing a differently configured stator, the machine usually must be practically completely rebuilt.

It is also known to use an industrial robot along with appropriate wire guides to lay the lead wires into the terminal channels and to use an auxiliary device to crimp the tabs against the wires Use of a robot, particularly one that is readily programmable, offers the advantage that a robot can quickly be adapted for use with stators of differing configurations, so that fewer (or no) tooling changes are needed when converting from the manufacture of a stator of one configuration to the manufacture of a stator of a different configuration. However, a simple, programmable industrial robot can only be used to effect connection of one lead wire at a time, and it is necessary to meet high speed production requirements that the robot act with considerable speed.

Connection of the lead wires to terminals with channels has proved to be difficult to accomplish at a sufficiently high speed with sufficient reliability for mass production. When using a robot to insert lead wires into terminal channels, some means must be provided for guiding the wires into the channels and any corner of a channel around which the lead wire is extended must be protected against engagement by the lead wire. If not protected, the lead wire may snag on the corner and damage the terminal or the insulating coating on the lead wire may be scraped away which would create the potential for an electrical short to occur. Also, the number of movements needed for the end effector of the robot to accomplish its tasks should be kept to a minimum to achieve optimum speed of operation.

In co-pending application of John M. Beakes and Howard S. Hunter, filed Apr. 20, 1990, Ser. No. 07/511,413, titled "Method and Apparatus for Inserting Stator Coil Lead Wires into Terminals having Wire receiving Channels", a method and apparatus is disclosed wherein a stator locating and terminal support tooling assembly is partly inserted into the bore of a wound stator in order to securely locate the stator at a predetermined, lead wire terminating station. The tooling assembly has an arbor that fits snugly within the bore of the stator to hold it in position and surfaces that prevent engagement between the lead wires and parts of the terminals and surfaces that prevent the terminals from being bent as a result of the steps done to connect the lead wires to the terminals. The end effector of an industrial robot grips a first one of the coil lead wires sufficiently near the coil from which it extends that the stretch of wire between the coil and its gripped portion can be controllably manipulated. (If this stretch of wire is too long, it may be too flexible or rubbery to enable it to be satisfactorily handled during the terminal connection and wire cutting process.) The tooling assembly is partly retracted from the stator so as to expose a relieved portion of the terminal adjacent the end of the channel into which the wire is to be inserted without being so fully retracted that it fails to continue to hold the position of the stator The gripped wire is laid over the terminal adjacent the end of its wire-receiving channel by movement of the robot end effector while the tooling assembly is partly retracted The tooling asssembly is then fully advanced toward the stator at which time the end of the channel is covered by parts of the tooling assembly. The robot is then manipulated to draw the wire lead into the channel of the terminal. During this time, parts of the terminal subjected to any bending forces are backed up by parts of the tooling asssembly. Also, a camming surface provided on the tooling assembly in conjunction with the movement of the robot end effector causes the lead wire to be located deeply within the channel. The foregoing process enables the lead wire to be placed in the terminal channel accurately, reliably, and with minimal end effector motion. The same process is then repeated for placing the other lead wires into the other terminals.

The method and apparatus of said co-pending application Ser. No. 07/511,413 also includes a method and apparatus for cutting each lead wire and for crimping the terminal tabs to the lead wires. The latter method and apparatus includes cutting blades formed on the tooling assembly. After each lead wire is placed in a terminal channel, it is coursed around and then severed against a cutting blade by movements of the robot end effector. The severed wire segment that remains connected to the end effector is disposed of by separation of the end effector jaws. The end effector jaws are then closed on one another and moved to press one of the terminal tabs against a supporting surface of the tooling assembly.

The method and apparatus of said co-pending application Ser. No. 07/511,413 has substantial advantages as compared to other methods and apparatus of terminating stator coil lead wires. However, it has a disadvantage in some cases that the end of the lead wire gripped by the robot end effector is cut away before the lead wire is crimped by the terminal tabs. In some cases the cut end of a lead wire between the terminal tabs will, due to its inherent resiliency, move out of the channel area between the tabs so that the subsequent crimping operation will not be effective to hold the lead wire within the terminal.

An object of this invention is to provide an improved method and apparatus for inserting and retaining stator coil lead wires in terminals having wire-receiving channels using an industrial robot.

In accordance with this invention, a stator locating and terminal support tooling assembly is provided which has an operation similar to the stator locating and terminal support tooling assembly disclosed in said co-pending application Ser. No. 07/511,413, but is provided with a terminal tab crimping and lead wire cutting mechanism by which the lead wires are each first crimped by the terminal tabs and thus temporarily connected thereto before the ends of the lead wires projecting beyond the terminals are cut away. Accordingly, the positions of the lead wires are maintained at all times by the robot end effector until they are secured to the terminals.

In another aspect of this invention, an object is to provide improved upper and lower start wire placing assemblies for holding the start wires away from the winding shuttle and the pole pieces on which the coils are wound to prevent the winding of the start wires under subsequently wound turns of the coils. In accordance with this aspect of the invention, each start wire placing assembly includes a pair of start wire hooks located at the winding station on opposite sides of a stator to be wound. During the winding of the first coil the start end of the wires (which are held by lead pull assemblies) are coursed through the stator bore and over the start wire hooks. The start wire hooks are subsequently moved to draw additional wire from the winding shuttle to form small loops in the start wire at each end of the stator core and to thereby hold each start wire away from its associated pole piece. Using this invention, the entire length of the first coil side being wound can be held out of the path of the nozzle of the winding shuttle and secure from being wound under subsequently wound coils. Accordingly, this invention provides a substantial improvement over prior start wire placing assemblies, such as disclosed in reference to FIGS. 15, 16, and 17 of U.S. Pat. No. 4,074,418, granted Feb. 21, 1978, to Harold I. Pearsall, titled "Stator Coil Winding and Lead Wire Connection", in which only a single hook is provided for holding a start wire away from a pole piece.

After the winding of the stator coils is completed, the start wire placing assemblies are retracted to thereby remove their start wire hooks from the loops formed in the start wires and a shuttle-type transfer assembly that includes start and finish wire lead clamps is moved into the winding station The lead pull assemblies, which may be conventional, are manipulated to insert the start and finish leads into the wire lead clamps. The transfer assembly then transfers the wound stator to the lead terminating station for the wire terminating operations described above.

The start wire loops formed by the operation of the start wire placing assemblies would cause the start wires to be excessively long unless steps are taken to pull the loops, and thus the potential for slackness, out of the start wires. The lead-terminating robot may be used for this purpose but it is desireable, in order to maintain adequate control over the handling of the wire by the robot end effector, to minimize the distance by which the robot end effector must move away from stator while holding a wire.

This problem is solved in accordance with this invention by mounting the start wire clamps for pivotal movement in a direction which will enable them to at least partly pull out the start wire loops before the robot grips the start wires. The robot end effector can be used to remove any additional excess start wire lengths not removed as a result of the pivotal movements of the start wire clamps.

It will be recognized that the start wire placing method and apparatus of this invention may be used with different lead terminating methods and apparatus and, conversely, that the lead terminating methods and apparatus of this invention do not require use of the start wire placing methods and apparatus of this invention. However, these two aspects of the invention are highly compatible in view of the need to accommodate or remove the excess lengths of the start wires as described above Other objects and advantages will become apparent from the following description and the drawings.

BRIEF DESCRIPTION OF THE DRAWINGS

FIG. 6 is a simplified, fragmentary, rear elevational view of the stator track and parts of the wound stator transfer assembly as viewed in the direction of arrows 6—6 of FIG. 5 shown during a time interval in which the wound stator is being transferred from the winding station to the coil lead terminating station.

FIG. 7 is a side elevational view of a portion of the wound stator transfer assembly as viewed in the direction of arrows 7—7 of FIG. 6 showing the upper finish lead clamp and a fragment of a finish lead which is clamped thereby.

FIG. 8 is a side elevational view of the portion of the transfer assembly shown in FIG. 7 and showing the upper finish clamp as oriented during a preceding interval of operation of the transfer assembly.

FIG. 9 is a cross sectional view of a portion of the wound stator transfer assembly taken along line 9—9 of FIG. 6 showing the upper start lead clamp and a fragment of a start lead which is clamped thereby. FIG. 9 further diagrammatically shows a wound coil and a start wire portion extending from the wound coil.

FIG. 10 is a cross sectional view of the wound stator transfer assembly similar to FIG. 9 and showing the upper start lead clamp pivoted to a different position.

FIG. 11 is a perspective view of an unwound stator located at the winding station with winding forms connected thereto. FIG. 11 also includes fragmentary illustrations of the winding shuttle, upper and lower lead pull assemblies, the upper lead placing assemblies, and the stator support track. The parts are shown in FIG. 11 at the commencement of the winding of the stator.

FIG. 12 is a perspective view similar to FIG. 11 after the commencement of the winding of the stator at the time when the first coil side has been extended through the stator.

FIG. 13 is a simplified, diagrammatic, cross sectional view illustrating the relative positions of the stator being wound, the winding shuttle, and the lead placing hooks at the time the shuttle nozzle reaches the position thereof shown in FIG. 12.

FIG. 14 is a perspective view similar to FIGS. 11 and 12 showing the parts during the interval of operation in which the winding ram is rotated to form the first end turn of the first coil and the lead placing hooks are pivoted to pull the coil start wire out of the path of the wire exit points of the shuttle nozzle.

FIG. 15 is a simplified, diagrammatic, cross sectional view for illustrating the relative positions of the stator being wound, the winding shuttle, and the lead placing hooks at the time shuttle nozzle and lead placing hooks reach the postions thereof shown in FIG. 14.

FIG. 16 is a simplified, fragmentary, and partly exploded perspective view of a wound stator with coil lead wires extending from the coils wound thereon, a conveyor track for the stator, wire clamps for releasably holding the coil leads, a transfer pin for transferring the stator along the track, and terminal support and wire guide tooling for supporting the stator and the stator terminals and for guiding the coil lead wires into the stator terminals. The support and wire guide tooling in addition includes a terminal tab crimping and lead wire cutting mechanism by which the lead wires are crimped by the terminal tabs and cut. FIG. 16 further shows a portion of a robot end effector that manipulates the lead wires to lay them into the terminal channels and that operates the cutting mechanisms in order to cut the lead wires.

DETAILED DESCRIPTION

Figure 16:
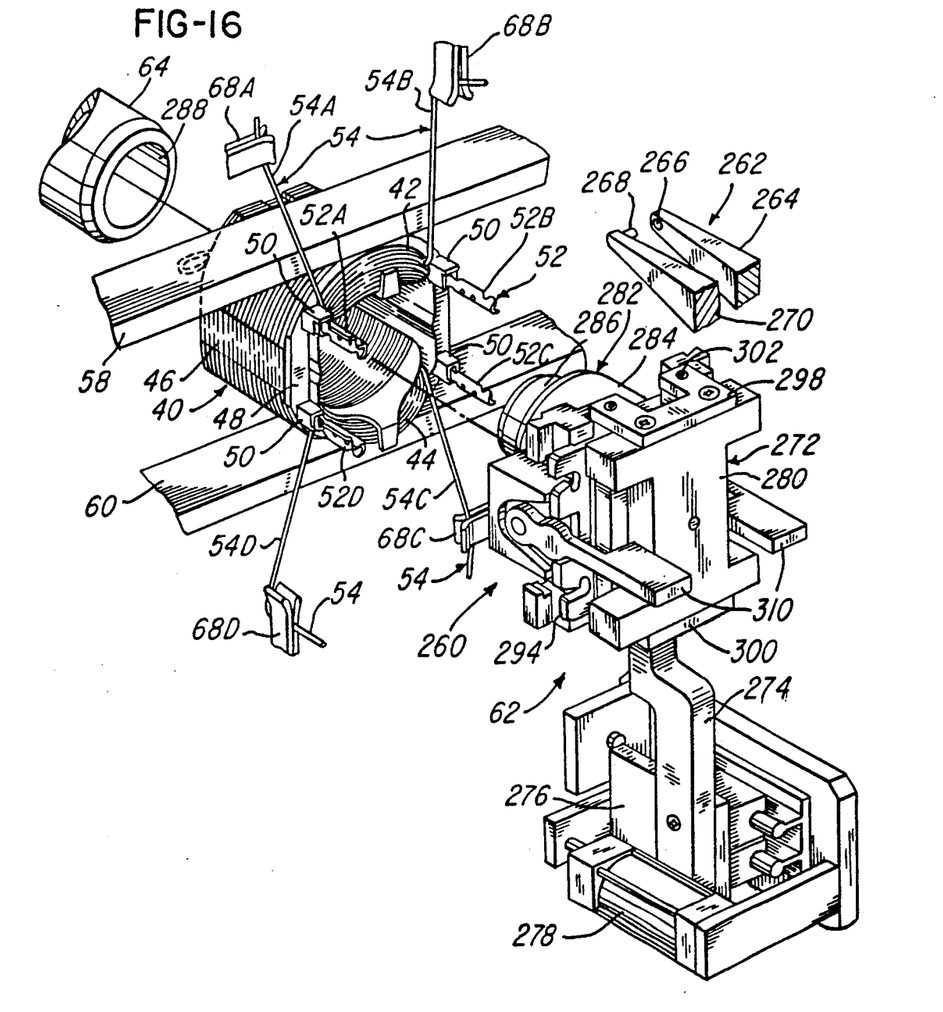

With reference to FIG. 16, this invention is shown in connection with the manufacture of a two-pole stator, generally designated 40, comprising a pair of field coils 42 and 44 wound on pole pieces of a laminated stator core 46. The end face, designated 48, of the stator core 46 which is visible in FIG. 16 is formed from a plastic terminal mounting plate having four terminal-receiving sockets 50 in which are mounted terminals, collectively identified by reference number 52 herein but individually identified in the drawings by numbers 52A, 52B, 52C, and 52D. Four coil lead wires, two for each coil 42 and 44, and collectively identified as lead wires 54 in this description are connected to the terminals 52. The coil lead wires 54 individually comprise an upper start lead wire 54A, an upper finish lead wire 54B, a lower start lead wire 54C, and a lower finish lead wire 54D.

Figures 6, 7, 8, 9, 10:
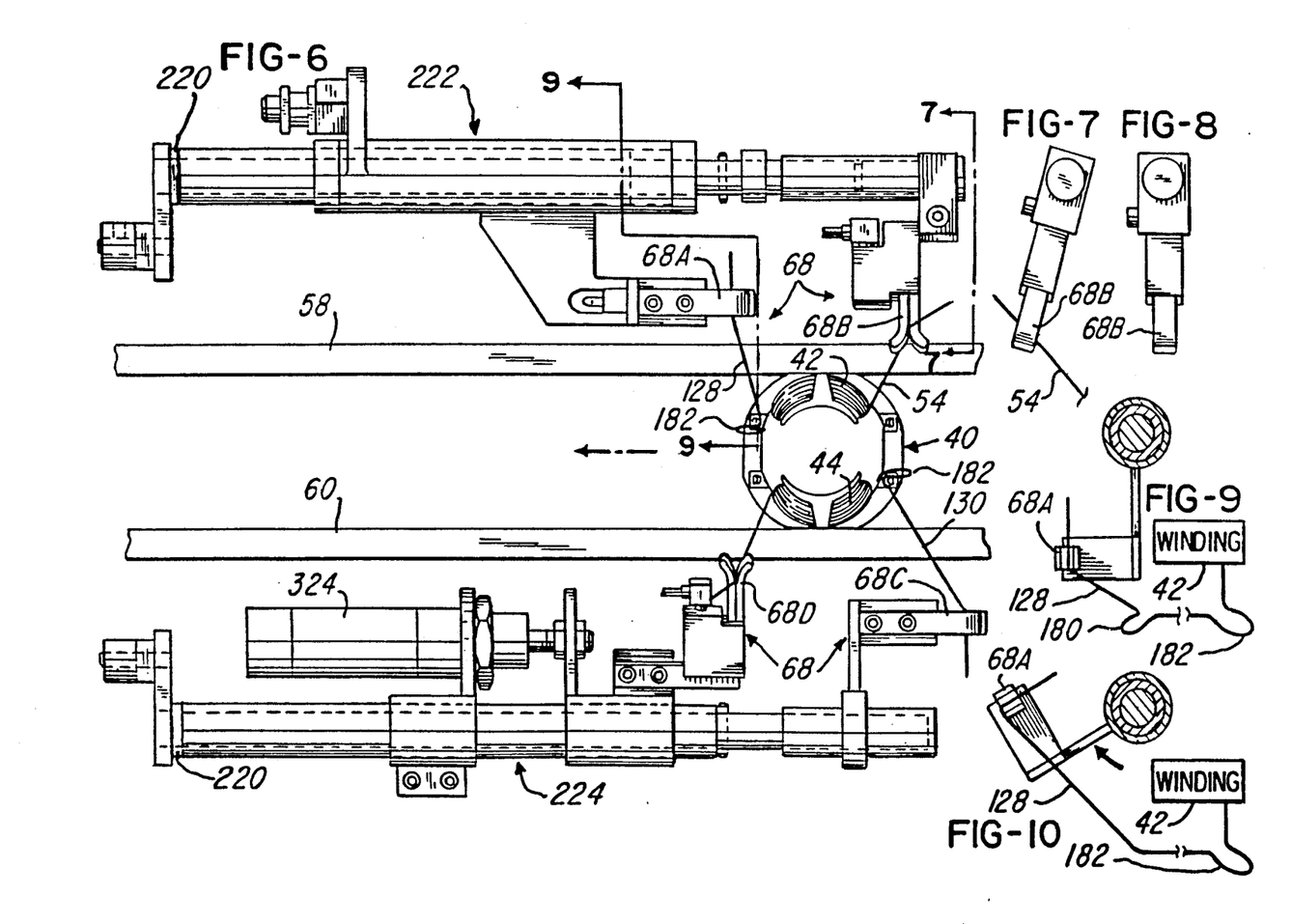

FIG. 16 shows the stator 40 supported by upper and lower support or conveyor tracks 58 and 60 at a lead wire terminating station 62 to which it has been moved along the tracks 58 and 6 by a transfer pin 64 adapted to fit within the bore of the stator 40. In accordance with known practice, the transfer pin 64 is mounted on a transfer assembly, shown best in FIG. 4, generally designated 66, on which four wire clamps, collectively identified 68, are also mounted. With reference also to FIG. 6, the clamps 68 individually comprise an upper start wire clamp 68A, an upper finish wire clamp 68B, a lower start wire clamp 68C, and a lower finish wire clamp 68D. The clamps 68 are preferably pneumatically (or electrically) operated so that they may be controllably opened and closed for reasons discussed below.

Figure 2A:
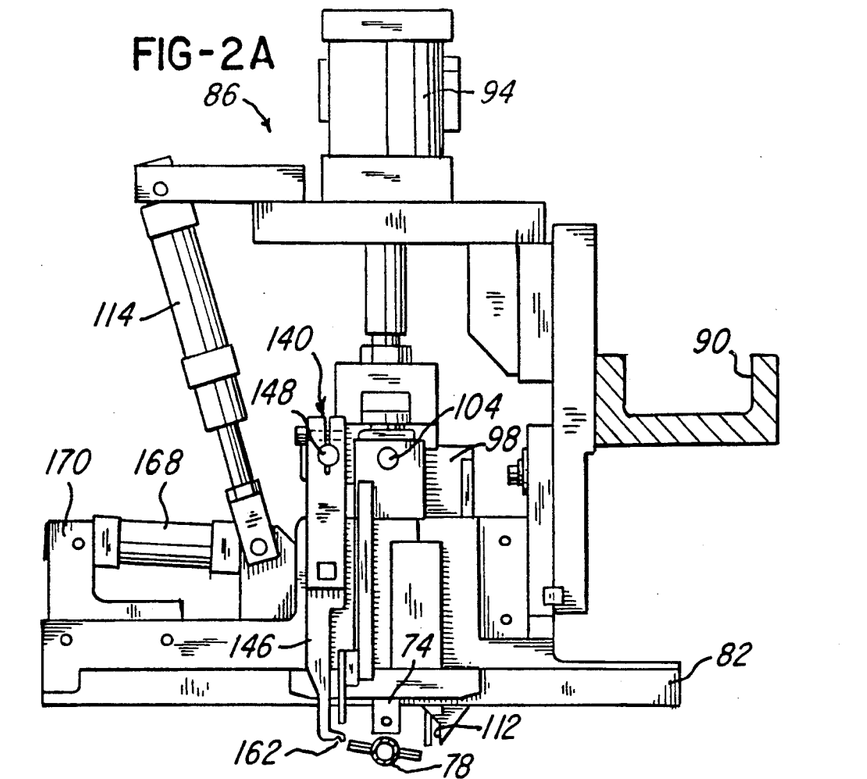
FIG. 2A and 2B are elevation views of the apparatus shown in FIGS. 1A and 1B, respectively, bu from the rear side thereof.
Figures 3, 4:
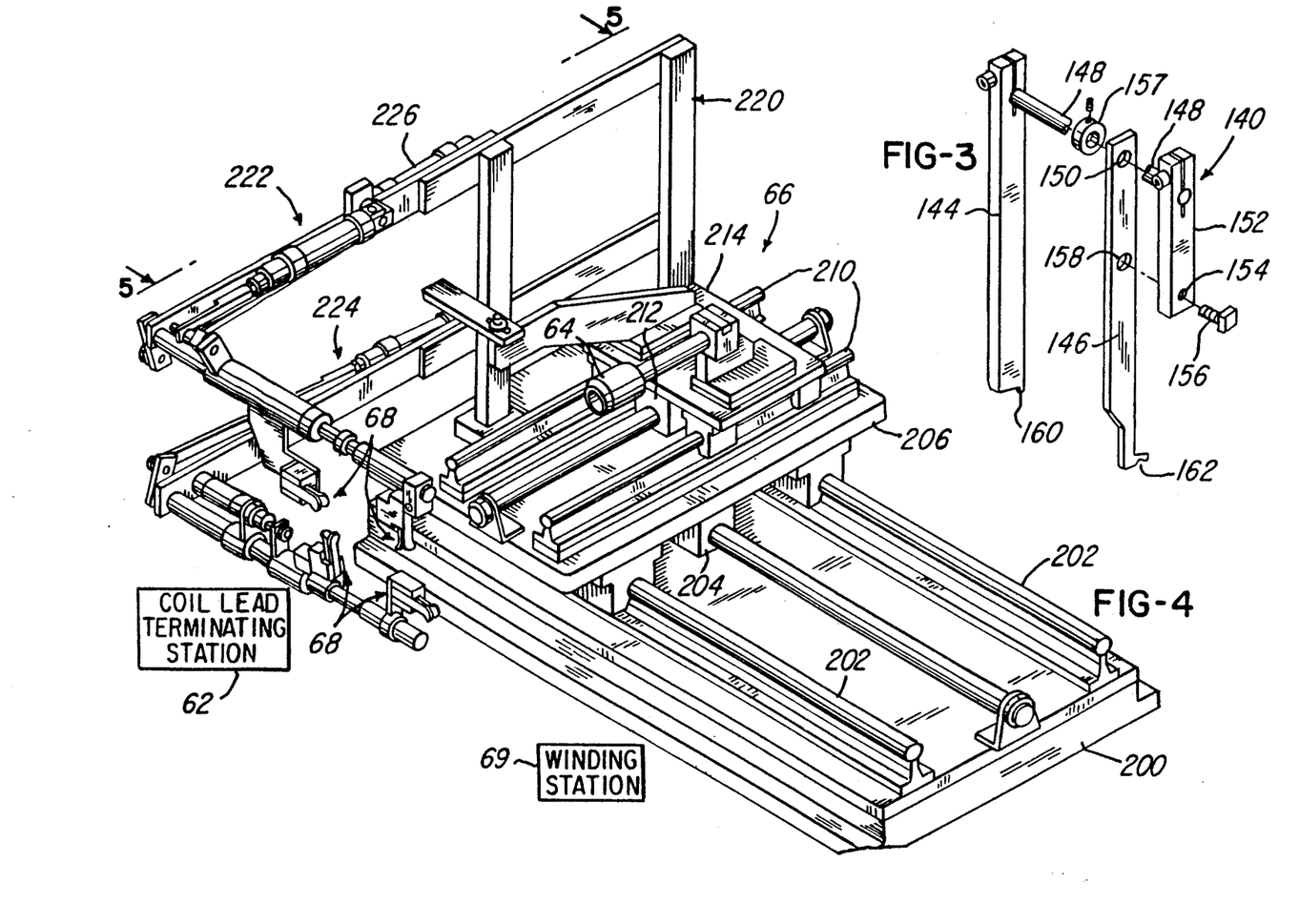
FIG. 3 is a fragmentary, exploded perspective view of a portion of the upper wire placing assembly of FIGS. 1A and 2A.
FIG. 4 is a perspective view of a wound stator transfer assembly for moving wound stators and stator coil lead wires extending from the coils wound thereon from the winding station, illustrated in block diagram form, to a coil lead terminating station, also illustrated in block diagram form.

As illustrated diagrammatically in FIG. 4, the transfer pin 64 is shuttled back and forth between the lead wire terminating station 62 and a stator coil winding station 69. With reference to FIGS. 11-15, a stator 40 located at the winding station 69 is provided, as is conventional, with an upper pair of shrouds or winding forms 70 and a lower pair of shrouds or winding forms 72. The winding forms 70 and 72 are effectively clamped to the stator core 46 by upper and lower pairs of form retainer plates 74 and 76 shown in FIGS. 1A, 1B, and 2A, as well known.

With reference to FIGS. 1A, 1B, 2A and 2B, a stator (not shown in these figures) may be advanced by a suitable mechanism (not shown) into the stator coil winding station 69 with its center axis aligned with the longitudinal axis of a wire winding ram or shuttle 78. Each stator 40 to be wound is supported in the winding station by upper and lower stator guide rails 82 and 84, respectively, that are part of upper and lower winding station tooling assemblies 86 and 88, respectively, which are mounted on fixed frame members 90 and 92. The upper and lower winding station tooling assemblies 86 and 88 include retaining blade assembly air actuators 94 and 96, respectively, that drive pistons to which retaining blade mounting blocks 98 and 100, respectively, are affixed. The retaining blades 74 and 76, which are constrained to move vertically by guide plates 102, are connected to the blade mounting blocks 98 and 100 by drive pins 104 and 106, respectively As is well known, the form retaining plates or blades 74 and 76 are moved by operation of the actuators 94 and 96 into three different positions. These comprise a first, fully retracted position out of the path of movement of a stator being moved into or out of the winding station 69 and is the position of the lower retaining blades 76 shown in FIG. 1B. The second is a fully extended position in which the retaining blades are extended maximally toward the horizontal axis of the stator to engage parts of the winding forms. The third position of each of the form retainer blades 74 and 76 is a partially retracted position which is close to the second, fully extended position. The retaining blades 74 and 76 are moved to the third position to clamp the winding forms to a stator in preparation for the winding of coils thereon. This is the position of the upper retaining blades 74 shown in FIGS. 1A and 2A.

Figure 1A:
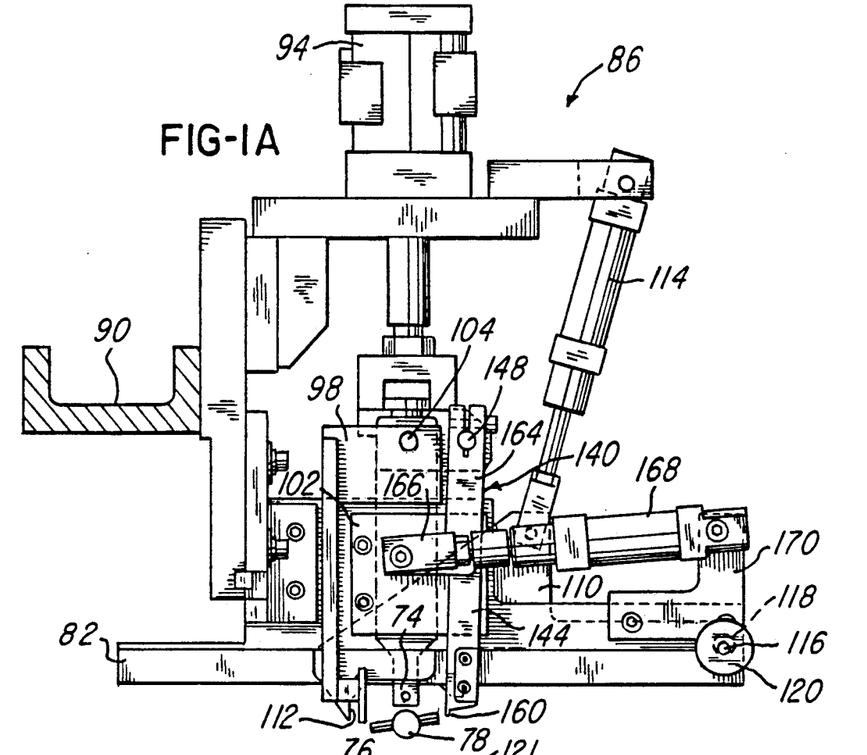
FIG. 1A is an elevational view from the front side of the winding station of apparatus in accordance with this invention showing parts including the upper run of a stator guide rail and support assembly, a winding nozzle, an upper start wire placing assembly, and parts of a mechanism for retaining the upper winding forms in a stator being wound The wire placing assembly and the stator retaining mechanism are shown in FIG. 1A in the positions they would occupy while a stator is being wound. For simplification, neither the stator being wound nor the winding forms are shown in FIG. 1A.

A pivotally-mounted stator chuck plate 110 having stator-engaging surfaces 112 and pivotally moved by an air operated clamping actuator 114 that forms part of the upper tooling assembly 86 is used in known fashion to clamp the stator to be wound in an accurately fixed position in the winding station 69. The pivot axis of the chuck plate 110 may be fixed, as is conventional, or it may be movable up and down to accommodate stators having different outer dimensions. Thus the pivot axis may be coincident with a pivot pin 116 shown in FIG. 1A that is rotatably received within a bore (not shown) in the chuck plate 110. In the past, the pivot pin 116 has been cylindrical and its center axis coincident with the axis of the bore within the chuck plate 110, so the chuck plate could only be used to accurately position a stator having one predetermined outer diameter or outer dimension. The chuck plate 110 may be adapted for accurately positioning stators having different outer dimensions by providing the pivot pin 116 with an eccentric flange 118 located in the chuck plate bore and by moving the pivot axis of the chuck plate 110 through the range of movements made possible by the eccentricity of the pivot pin flange 118. In FIG. 1A it will be noted that the pivot pin 116 is provided with a knob 120 which may be rotated to change the height of the pivot axis of the chuck plate 110 to accommodate stators of different outer dimensions.

Figure 2B:
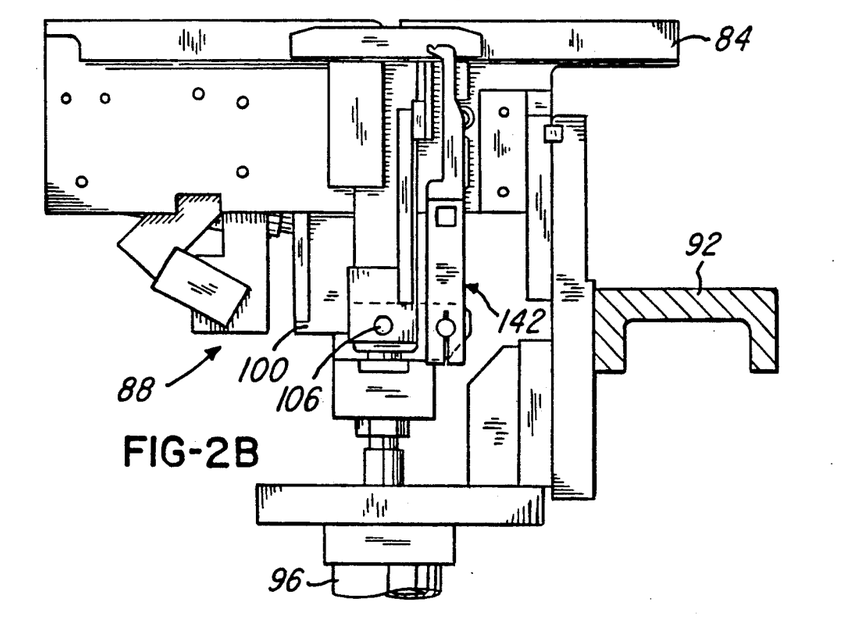

With reference to FIG. 2B, the presence of a stator in location at the winding station 69 is sensed by a sensing switch that responds to pivotal movement of a sensing plate 121. (Here it may be noted that the controls for the apparatus of this invention may comprise conventional machine controls that rely upon various sensing means which, for the most part, are not described herein.) The stator in the winding station may now be wound by repeated reciprocal and oscillatory movements of the winding shuttle 78 along and about its longitudinal axis to draw wires from sources (not shown) of wire under tension, which wires exit through wire-exit needles 122 and, guided by the winding forms 70 and 72, are wrapped around the stator pole pieces to form the coils 42 and 44 as the shuttle 78 repeatedly reciprocates and oscillates.

Figures 11, 12, 13, 14, 15:
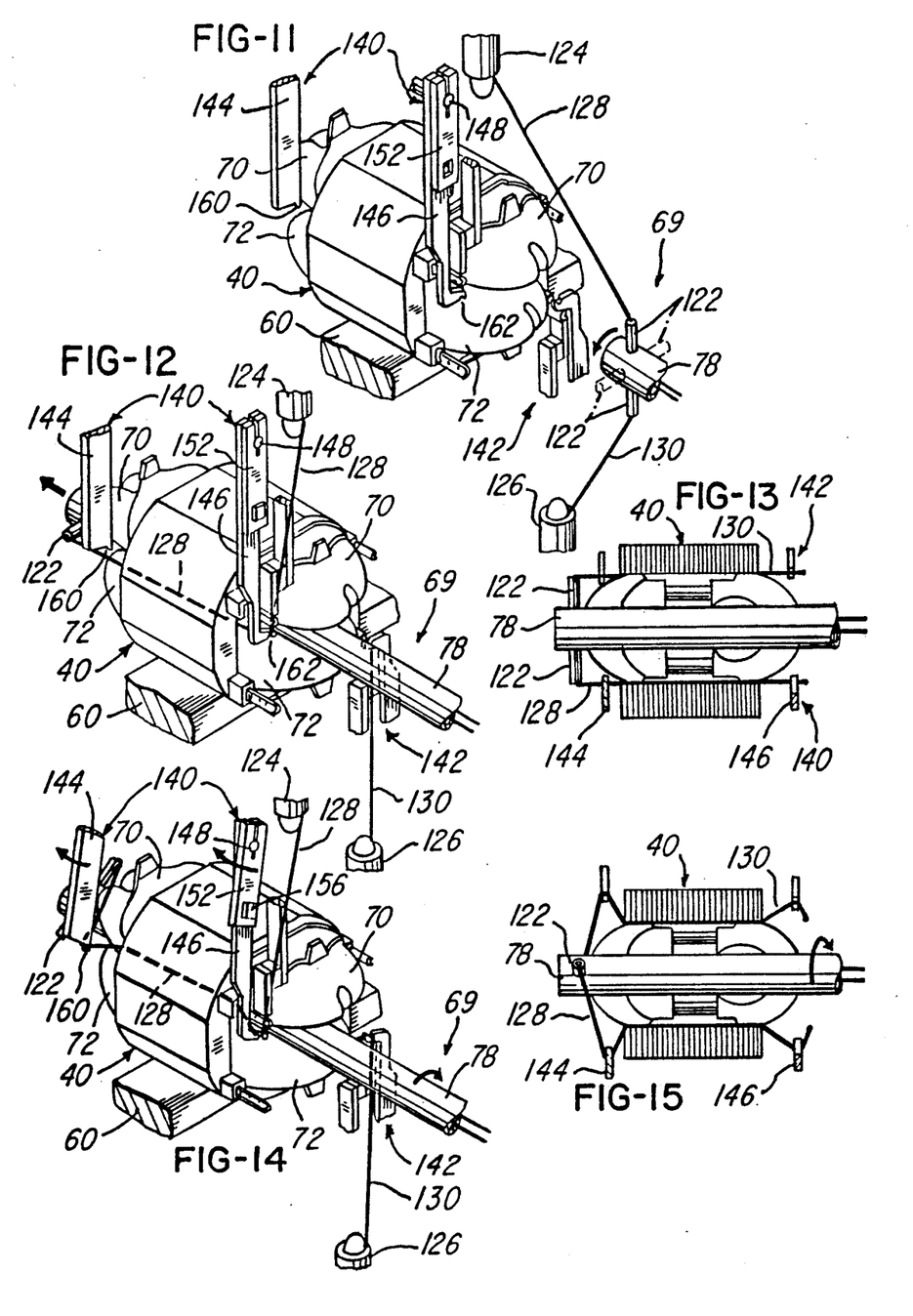

FIG. 11 shows parts in readiness to start the winding of a stator 40. At this time, the free ends of the wires extending out of the needles 122 are held, respectively, by an upper lead pull, hold, and cut assembly 124 and a lower lead pull, hold, and cut assembly 126 which, for simplicity, are called "lead pulls" herein. Lead pulls of this type are well known in the art. During the winding operation, the lead pulls 124 and 126 maintain their grip on the ends of the wires so that the wire segments used to form the stator coils 42 and 44 are drawn through winding shuttle 78.

In accordance with this invention, the start wires, designated 128 and 130, which are the wire segments leading from the lead pulls 124 and 126 and extending through the bore of the stator to form the first sides of the first coils wound, are held away from the stator pole pieces by respective upper and lower start wire placing assemblies, generally designated 140 and 142. Referring to FIGS. 3 and 11, the upper start wire placing assembly 140 comprises a pair of elongated, vertically oriented placing blades namely a front placing blade 144 and a rear placing blade 146. (For convenience, the term "front" is used to refer to the parts of the machinery described herein facing an observer standing in front of the winding shuttle 78; accordingly, the term "rear" is used in the opposite sense. Thus, for example, the terminals 52 are on the rear side of the stator 40 at the winding station 69.) The front placing blade 144 is clamped to a pivotally mounted support pin 148, which as shown in FIGS. 1A and 2A is pivotally mounted in the same blade mounting block to which the retainer plates are connected. The rear placing blade 146 has a bore 150 that rotatably receives the pin 148. Clamped to the support pin 148 is a depending drive arm 152 which is held adjacent the rear placing blade 146 by a collar 157 and which has a threaded bore 154 that threadedly receives a drive screw 156. Drive screw 156 is threaded to and extends through the bore 154 and its shank is located within a bore 158 in the rear placing blade 146 with which the drive screw 156 is aligned. The lower end of the front placing blade 144 is provided with a downwardly and outwardly wire-engaging hook 160. The lower end of the rear placing blade 146 is provided with a downwardly facing wire-engaging hook 162. Referring to FIG. 1A, an L-shaped drive link 164 is also clamped to the support pin 148 and this link is connected by a bracket 166 to the piston rod of an air operated start wire placing actuator 168 and is pivotally mounted on a support member 170 fixed in relation to the fixed frame member 90.

FIGS. 11 through 15 illustrate the sequence of operations at the commencement of the winding operations. The winding shuttle 78 oscillates from its home position as shown in FIG. 11 as it begins also to reciprocate toward the stator 40. Prior to this time, the wire engaging blades have been lowered (along with the retaining blades 74 and 76) and pivoted sufficiently toward the center axis of the stator core by operation of the actuator 168 that their wire-engaging hooks 160 and 162 are positioned so that, as the start wire segment 128 is coursed through the bore of the stator, the start wire segment is extended over the rear placing blade hook 162 and adjacent the outwardly facing hook 160 of the front placing blade 144. This condition is illustrated in FIGS. 12 and 13.

With reference to FIGS. 14 and 15, as the shuttle 78 undergoes an oscillation to form the first end turn a the front end of the stator 40, its movement is momentarily interrupted and the placing actuator 168 is energized to rotate the support pin 148 so as to drive the front placing blade 144 away from the center of the stator 40. Rotation of the support pin 148 also causes rotation of the depending drive arm 152 which in turn imparts a rotary motion to the rear placing blade 146 due to the engagement of the margins of the bore 158 by the drive screw 156. Bore 158 and drive screw 156 provide a lost motion coupling that permits the front placing blade 144 to rotate further than the rear placing blade 146, the difference in the amount of rotation being dependent upon the amount by which the bore 158 is greater in diameter than the shank of the screw 156. Such difference may be required, as in the case of the stator 40, because of the geometry of the stator and the stator terminals. In the case of the stator 40, a greater rotation of the rear placing blade 146 would place an undue bending moment upon its associated start wire terminal. A relatively large rotation of the front placing blade 144 is required to create a relatively large span of the start wire at the front of the stator to avoid too much tension on the wire at the front of the stator. In other cases, there may be no need for a lost motion between the two placing blades and both could be clamped directly to the support pin 148.

Figure 1B:
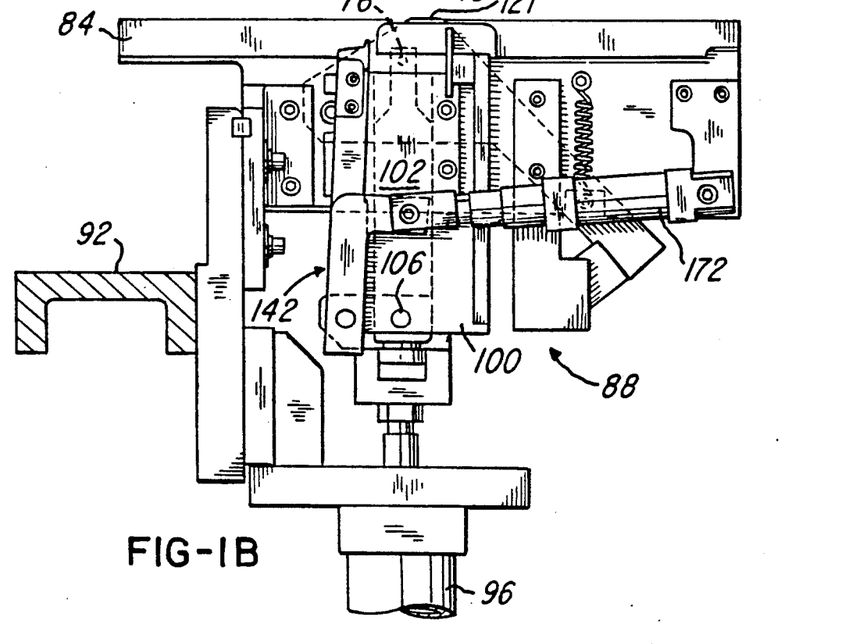
FIG. 1B is an elevational view similar to FIG. 1A but showing the lower run of the stator guide rail and support assembly and a lower start wire placing assembly and showing the wire placing assembly and the stator retaining mechanism in the positions they would occupy during a time interval between the winding of successively wound stators. The apparatus shown in FIG. 1B is located on the sheet of drawing in the same position relative to the apparatus shown in FIG. 1A that it occupies in the assembled apparatus of this invention.

With reference to FIG. 1B, the lower placing assembly 142 is constructed essentially identically to the upper placing assembly 140, except that, for convenience in manufacture, the lower placing actuator, designated 172, operates in a direction opposite to the upper placing actuator 168 and the linkage connecting it to the lower, front placing blade is somewhat different, as is apparent upon a comparison of FIGS. 1A and 1B.

Because of the provision of the placing blades, the start wires 128 and 130 can be held inwardly and outwardly from the stator pole pieces to insure that no portion of the start wires will be wound under succeeding turns of the coils. After the start wires are pulled aside by the placing assemblies 140 and 142, the winding of the stator coils 42 and 44 proceeds to conclusion in conventional fashion.

Figure 5:
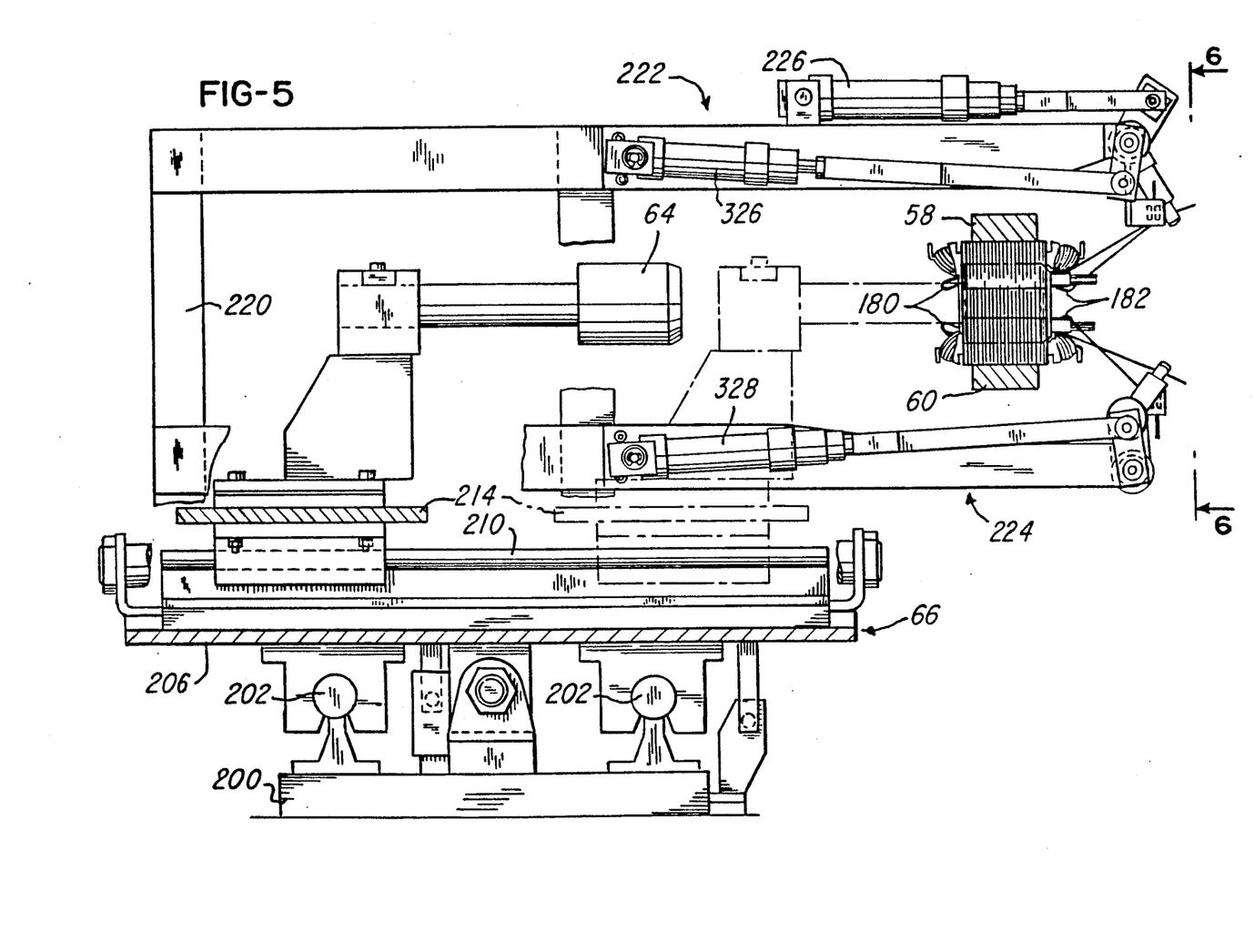
FIG. 5 is a side elevational view, with parts broken away and parts shown in cross section, of the wound stator transfer assembly as viewed in the direction of arrows 5—5 of FIG. 4, and showing a stator guide track and a wound stator in position to be transferred along the stator guide track.

After the winding of the stator coils 42 and 44 is completed, the transfer assembly 66 carries the wire clamps to the winding station 69 so that the lead pulls 124 and 126 may be operated to insert the start and finish leads into the wire clamps 68. With reference to FIG. 4, the transfer assembly 66 comprises a fixed base 200 having gibs 202 and a rodless actuator 204 that guide and drive a main transfer carriage 206 in a direction parallel to the conveyor track along which the freshly wound stator 40 is moved to bring it to the lead terminating station 62. Main transfer carriage 206 has gibs 210 and a rodless actuator 212 that guide and drive a transfer pin carriage 214 in a direction perpendicular to the conveyor track along which the freshly wound stator 40 is moved to bring it to the lead terminating station 62. The transfer pin 64 is mounted on the transfer pin carriage 214. Accordingly, the transfer pin 64 may be shuttled between the coil lead terminating station 62 and the winding station 69 and also moved back and forth, as illustrated in FIG. 5, so that it may move into and out of the bores of successively wound stators to move them along the conveyor tracks 58 and 60 to the coil lead terminating station 62.

The main transfer carriage 206 also supports a framework 220 on which are mounted upper and lower wire clamp assemblies 222 and 224, respectively, that include the wire clamps 68. In operation, after the coils 42 and 44 are wound, the main transfer carriage 206 is moved toward the winding station 69 with the pin carriage 214 retracted forwardly away from the winding station 69. This brings the clamps 68 into the winding station. At this time, the upper finish wire clamp 68B is pivoted, by operation of an air actuator 226 carried by the framework 220, to the position shown in FIG. 8, out of the way of the segment of the upper start wire 128 extending between the upper lead pull 124 and the rear placing hook 162. As the start wire clamps 68A and 68C approach the start wires in the winding station 69, they are opened so that their jaws can straddle the start wires The start wire clamps 68A and 68C are therafter closed to grip the start wires 128 and 130.

After the start wires 128 and 130 are gripped by the clamps 68A and 68C, the lead pulls 124 and 126 release them and are moved as needed to hook the finish wires extending from the wound coils to the winding shuttle 78. Once the finish wires have been hooked, they may be inserted in conventional fashion between the opened jaws of the finish wire clamps 68B and 68D. Of course, the upper finish wire clamp 68B is previously pivoted by the actuator 226 to locate it as shown in FIGS. 6 and 7 in position to receive the upper finish lead wire 54. The finish wire clamps are now closed to grip the finish wires.

After the wire leads 54 are connected to the clamps 68, as just described, the winding forms are removed, by known means that forms no part of this invention, and the retaining blades 74 and 76 are retracted by operation of the air actuators 94 and 96. Because the placing blades 144 and 146 are retracted with the retaining blades 74 and 76, the placing blade hooks 160 and 162 become disengaged from the start wire 128 and 130, leaving behind small loops in the start wires 128 and 130 at each end of the stator core 46. The small loops at the front are designated 180 and the small loops at the rear are designated 182. These are removed during subsequent operations as will be described below. The parts are now in readiness for the pin carriage 214 to move rearwardly so that the transfer pin 64 is inserted into the freshly wound stator 40. When this is accomplished, the main transfer carriage 206 is returned to the lead terminating station 62, carrying the wound stator and the lead clamps 68 with it, as shown in FIG. 6. The stator 40 is now located in readiness for the temporary connection of the lead wires 54 to the terminals 52, aligned as shown in FIG. 16.

Figures 24, 25, 26, 27, 28, 29:
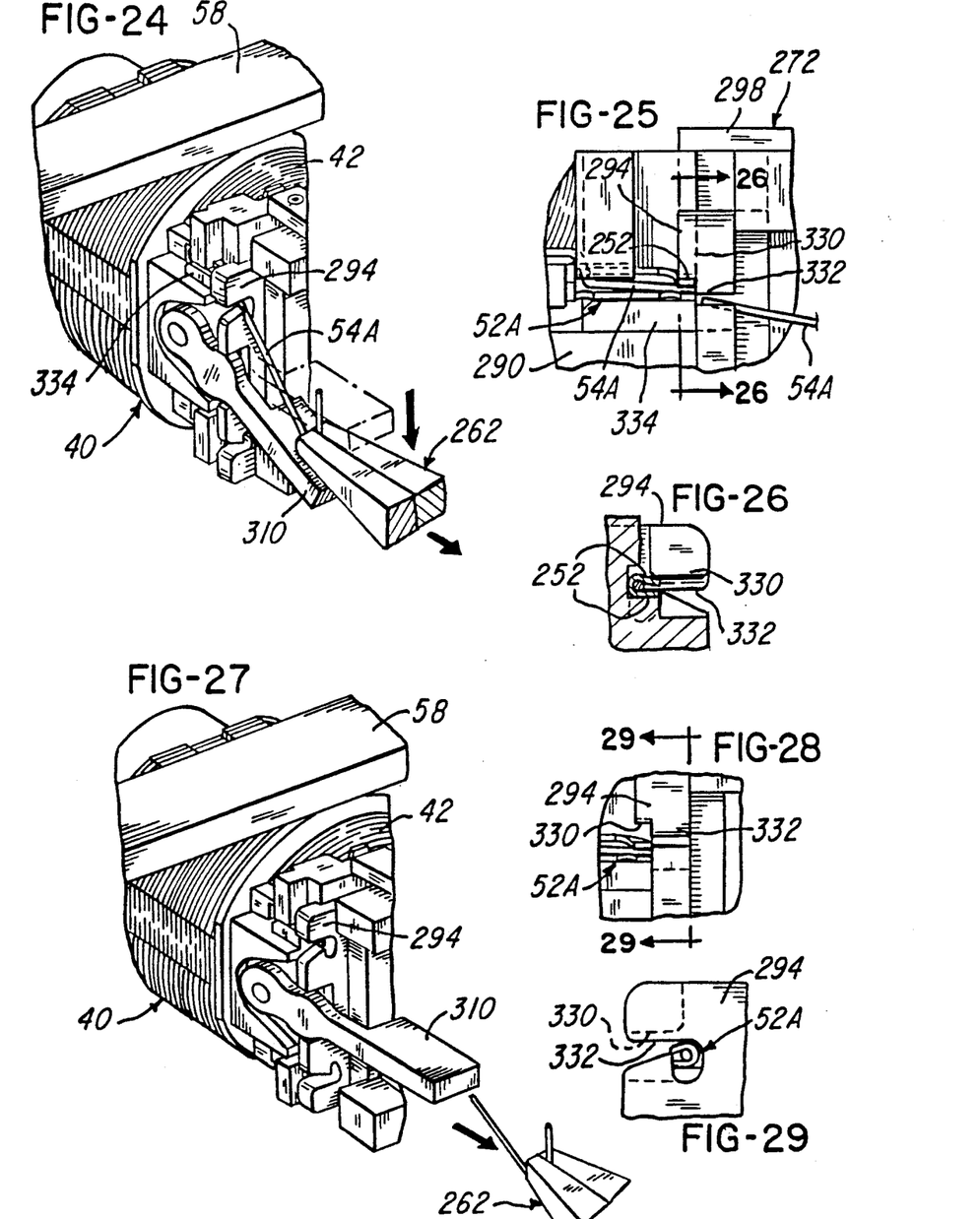
FIG. 24 is a view similar to FIGS. 17 and 21 and illustrates the operation of the tab crimping and wire cutting mechanism associated with the terminal support and wire guide tooling.
FIG. 25 is a fragmentary, side elevational view of the stator and terminal support and wire guide tooling showing the stator nd tooling in positions they occupy in FIG. 24 with a coil lead wire crimped by the terminal tabs and a fragment of the wire portion cut away.
FIG. 26 is a cross sectional view of a portion of the terminal support and wire guide tooling similar to FIG. 23 but taken along line 26—26 of FIG. 25.
FIG. 27 is a view similar to FIGS. 17, 21 and 24 and illustrates the position of parts as a robot end effector moves out of engagement with the terminal tab crimping and lead wire mechanism.
FIG. 28 is a fragmentary, side elevational view of portions of the crimped terminal and the terminal support and wire guide tooling after completion of the steps shown in FIG. 27.
FIG. 29 is a fragmentary, rear elevational view of the tooling and terminal as viewed in the direction of arrow 29—29 in FIG. 28.

Before describing the lead terminating apparatus and method, it may be helpful to note that the illustrated terminals 52 are of a type commercially available from AMP Incorporated of Harrisburg, Pa. Each terminal 52 has a longitudinally-extending, wire-receiving channel 250 spaced from its associated socket 50 by a short spacer or channel entry relief section 251. The sidewalls 254 of the channel 250 have notches near their outer ends that form tabs 252 at the outer end of each terminal 52 which may be crimped or squeezed together, as shown in FIGS. 25 and 26, to temporarily connect the lead wires to the terminals without changing the shapes of the rest of the terminals 52. As previously mentioned, the remaining portion of the channels 254 are rolled around their respective lead wires at a different processing station (not shown). The notched outer ends of the terminals 52 are cut away at the same station along with any excess lengths of the lead wires.

The lead wire connecting method and apparatus of this invention utilizes a tooling assembly 260 and an industrial robot. The robot is not shown except for its end effector, designated 262. As best shown in FIG. 16, the end effector 262 is pliers-like in form and has a first jaw 264 having a bore 266 at its outer end adapted to receive a pin 268 extending from the outer end of a second jaw 270. Jaws 264 and 270 are movable horizontally toward and away from each other, as is common in industrial robots, and, for reasons which will become apparent, the gripper jaws 264 and 270 are so controlled that the clamping pressures applied by them can be varied. For example, as will be readily recognized by those familiar in the art, the gripper jaws 264 and 270 may be controlled by a variable air actuator. Otherwise, the robot may be entirely conventional and is not further illustrated herein. Although different types of robots may be useful in the practice of this invention, a three-axis Cartesian robot is presently preferred.

Figure 30:
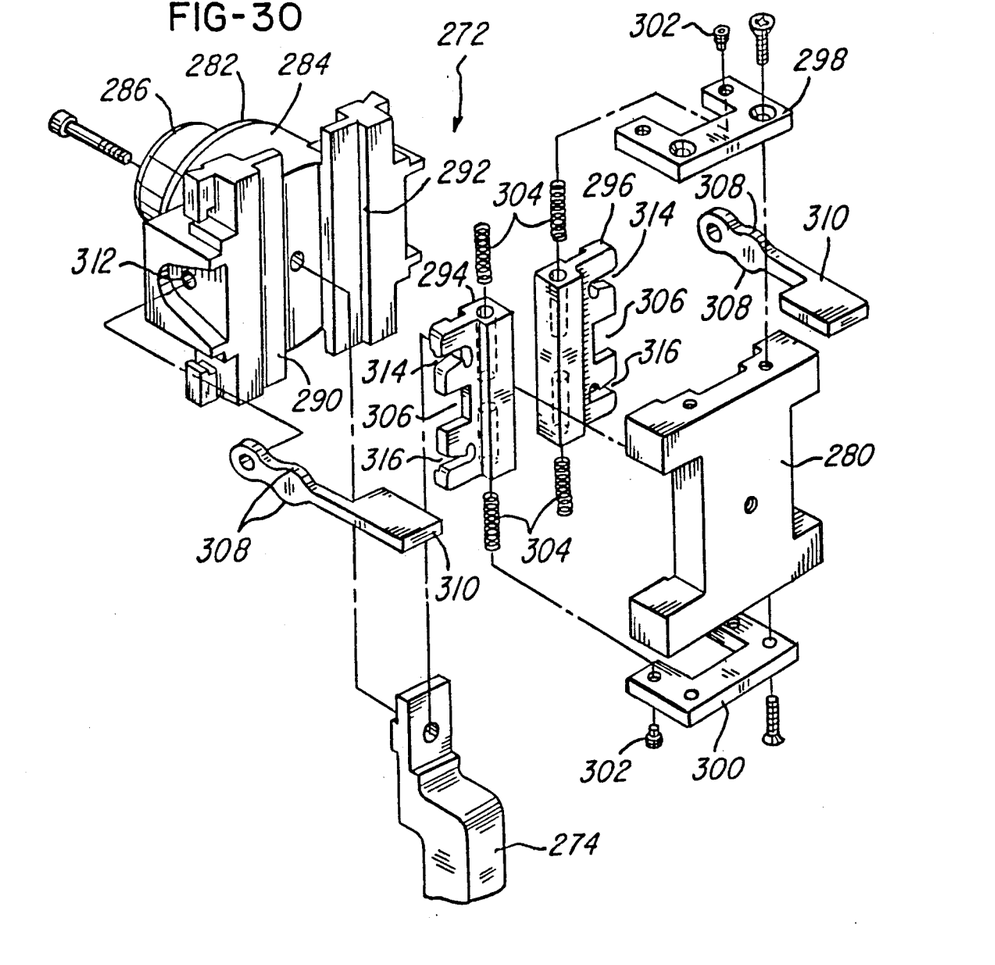
FIG. 30 is a fragmentary, exploded perspective view of the terminal support and wire guide tooling including the terminal tab crimping and lead wire cutting mechanism.

With reference to FIGS. 16 and 30, a terminal crimping and wire cutting fixture, generally desigated 272, is affixed to the top of a stanchion 274 which is mounted on a carriage 276 that is driven toward and away from the stator 40 supported in the terminating station 62 by means of a tooling actuator 278.

The fixture 272 comprises a two part housing consisting of an H-shaped rear hosing plate 280 and a generally cylindrical front body member, generally designated 282. The front body member 282 has a first, forwardly projecting, larger diameter arbor section 284 adapted to be snugly received within the bore of the stator 40 at the lead connect terminating station 62, and a second, smaller diameter arbor section 286 adapted to be received snugly within a bore 288 in the confronting end of the transfer pin 62. The front body member 282 also has a pair of vertical slide members 290 and 292 mounted, respectively, on the opposite sides and rear of the large, diameter arbor section 284, which cooperate with the rear housing plate 280 to form chambers within which a pair of spring-biased terminal crimping and lead wire cutting members 294 and 296 are mounted for vertical movement. Upper and lower spring retaining plates 298 and 300 are mounted on top and bottom of the rear housing plate 280. They threadedly support alignment pins 302 which confine upper and lower pairs of coil springs 304 that bias the terminal crimping and lead wire cutting members 294 and 296 to a mid position.

The terminal crimping and lead wire cutting member 294 has an outwardly facing central notch 306 engaged by generally cylindrical upper and lower camming surfaces 308 of a terminal crimping and lead wire cutting actuator lever 310 that is pivotally mounted by a pivot pin (not shown) in socket 312 on the outwardly facing surface of the left side slide member 290 as viewed in FIG. 30. The terminal crimping and lead wire cutting member 296 similarly has a notch 306 engaged by another lever 310 pivoted to the other slide member 292.

The terminal crimping and lead wire cutting member 294 additionally has outwardly facing upper notched portions 314 and lower notched portions 316. Each of the notched portions 314 and 316 cooperate with surfaces of the vertical slide members 290 and 292 to crimp the terminal tabs and sever the excess ends of the lead wires, as will be described below.

Figures 17, 18, 19, 20:
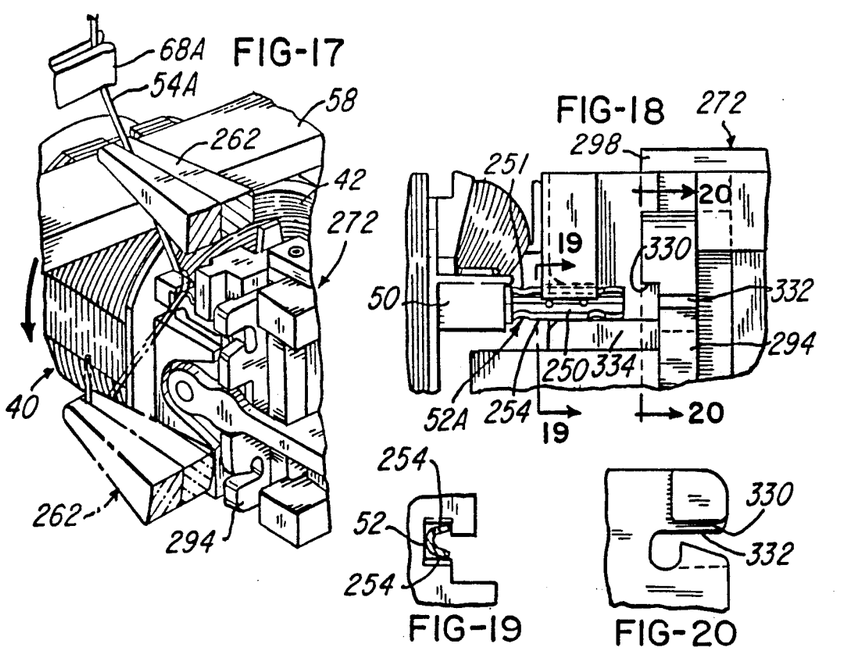
FIG. 17 is an enlarged, fragmentary perspective view of parts shown in FIG. 16 and illustrates the initial steps of inserting a coil lead wire into the wire-receiving channel of a terminal.
FIG. 18 is a fragmentary, side elevational view of the stator and terimal support wire guide tooling showing the stator and tooling in positions they occupy in FIG. 17.
FIG. 19 is a fragmentary, front elevational view of a portion of the terminal support and wire guide tooling, and a cross sectional view of a terminal partly inserted in the tooling as viewed in the direction of and taken along lines 19—19 of FIG. 18.
FIG. 20 is a fragmentary, front elevational view of another portion of the terminal support and wire guide tooling as viewed in the direction of arrows 20—20 of FIG. 18.
Figures 21, 22, 23:
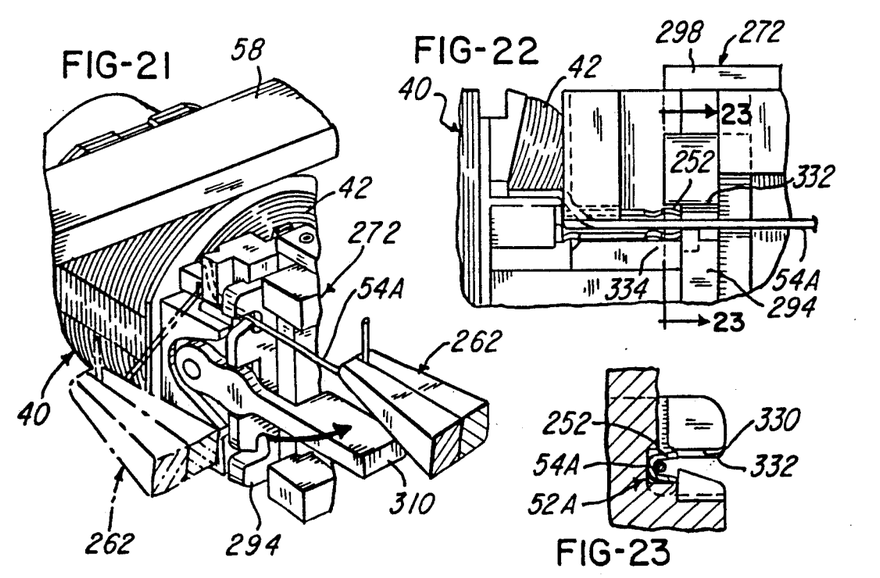
FIG. 21 is a view similar to FIG. 17 and illustrates further steps resulting in the insertion of a coil lead wire into the wire-receiving channel in the terminal.
FIG. 22 is a fragmentary, side elevational view of the stator and terminal support and wire guide tooling showing the stator and tooling in positions they occupy in FIG. 21 with a coil lead wire inserted into the terminal channel.
FIG. 23 is a cross sectional view of a portion of the terminal support and wire guide tooling, the terminal, and the lead wire taken along line 23—23 of FIG. 22.

In operation, with reference to FIGS. 16-29, when a stator 40 reaches the lead termination station 62, the tooling assembly 272 is driven by the positioning actuator 278 toward the stator 40. The arbor sections 284 and 286 advance into engagement with the transfer pin 64 and the bore of the stator 40 to insure that the stator 40 is accurately positioned. At this time, as shown in FIG. 18, the terminal 52A rests on an anvil surface on the fixture 272. The robot is then activated so that its end effector 262 moves into a location where it can grip the upper start lead wire 54A positioned as shown in full lines in FIG. 17.

Here, it should be noted that the position of the various lead wires 54 at the lead terminating station 62 can be altered from their positions at the winding station 69 to accommodate the movements of the robot end effector and any tooling constraints. In general, it is found that the lead wires 54 should be spread further apart at the lead terminating station, and this can be accomplished by appropriately moving the lead wire clamps 58 by means of air actuators such as the actuator 324 shown in FIG. 6. Also, it should be noted that the loops in the upper start wire 128 can be partly removed by the simple expedient of rotating the start wire clamps 68A from the position thereof shown in FIGS. 6 and 9 to its position shown in FIG. 10 by means of air actuators 326 and 328, whereupon the start upper wire 128 is pulled upwardly and outwardly away from the stator core. The lower start wire 130 can be handled identically using air actuator 228 to pivot the lower start wire clamp 68C. As diagammatically represented in FIG. 10, such movement of the start wire clamps may be sufficient to at least completely remove one of the loops 180. Such movements of the start wire clamps must, of course, be accomplished prior to the operation of the robot end effector. Otherwise, there would be too much slack wire for the end effector to handle properly.

Returning to the operation of the end effector 262 and the crimping and cutting fixture 272, the end effector operations to lay the wire into the terminal channel is evident from an inspection of FIGS. 17 through 23. It should be noted in FIGS. 18 through 20 that the fixture 272 is held slightly spaced from the stator 40 when the end effector 262 is manipulated to lay the wire over terminal socket 50. This is a step that would not be needed with a socket or a terminal of a different configuration.

After the wire is inserted into the channel, the end effector is manipulated as illustrated in FIGS. 24 through 29 to engage and depress the lever 310 to first cause a hammer portion 330 of the terminal crimping and wire cutting member 294 to crimp the lead wire between the terminal tabs 252 and then sever the lead wire portion remaining connected to the end effector by a shearing action between a cutting blade 332 on the member 294 and a fixed ledge 334 on the vertical slide 290.

It will be recognized that the end effector can be moved as needed to completely remove the loops 180 and 182 in the start wire before the operations shown in FIGS. 17 through 29. Also, it will be readily apparent that, after the first lead wire is severed, the end effector 262 can be opened to discard the remnant piece of wire in its grasp and that the other lead wires can be connected to their respective terminals by similar and appropriate movements of the end effector.

Although the presently preferred embodiment of this invention has been described, it will be understood that within the purview of this invention various changes may be made within the scope of the following claims.

We claim:

1. A method of manufacturing stators of the type having a stator core having an end face with terminal-receiving sockets and terminals held by said sockets, each of said terminals having a trough-like, longitudinally-extending, wire-receiving channel, a pair of coils sound on said stator core, each coil having at least one pair of lead wires extending therefrom, each said lead wire having a fixed end extending from a stator coil and a free end held by a clamp so that it extends alongside its associated said socket, said method comprising the steps of:
   providing a terminal crimping member operable in response to movements of a pliers-like robot end effector to crimp a portion of one of the terminals on said stator to a segment of a lead wire;
   relatively positioning a stator and said terminal crimping member adjacent one another to enable said crimping member to crimp a portion of one of the terminals on said stator to a segment of a lead wire;
   gripping said lead wire intermediate said clamp and said coil by said end effector;
   moving said end effector to place said lead wire into said channel;
   moving said end effector to cause said terminal crimping member to crimp a portion of said terminal against said segment of said lead wire; and
   thereafter cutting the end of the lead wire gripped by said end effector free from said segment of said lead wire.

2. The method of claim 1 wherein said terminal crimping member includes a terminal tab crimping and lead wire cutting mechanism including a pivotal actuator lever for operating said terminal crimping member and wherein said step of crimping said terminal against said lead wire is accomplished by moving said end effector so that it engages and pivotally moves said actuator lever.

3. A method of manufacturing stators of the type having a stator core having an end face with terminal-receiving sockets and terminals held by said sockets, each of said terminals having a trough-like, longitudinally-extending, wire-receiving channel, a pair of coils wound on said stator core, each coil having at least one pair of lead wires extending therefrom, each said lead wire having a fixed end extending from a stator coil and a free end held by a clamp so that it extends alongside its associated said socket, said method comprising the steps of:
   moving at least one of said clamps between a first position wherein it holds a lead wire at a first distance from said stator core to a second position wherein it holds the lead wire at a second, greater distance from said stator core to thereby reduce slack in the lead wire;
   gripping said lead wire intermediate said clamp and said coil by a pliers-like robot end effector; and
   moving said end effector to place said lead wire into said channel.

4. A method of manufacturing stators of the type having a stator core having an end face with terminal-receiving sockets and terminals held by said sockets, a pair of coils wound on said stator core, each coil having at least one pair of lead wires extending therefrom, each said lead wire having a fixed end extending from a stator coil and a free end held by a clamp so that it extends alongside its associated said socket, one of said lead wires of each of said stator coils being formed so that it is slack, said method comprising the steps of:
   at least partly removing the slack in said lead wires by movements of their associated clamps;
   gripping one of said lead wires intermediate its associated said clamp and said coil by a pliers-like robot end effector; and
   moving said end effector to place said lead wire adjacent said terminal for subsequent connection thereto.

5. Apparatus for manufacturing stators of the type having a stator core having an end face with terminal-receiving sockets and terminals held by said sockets, each of said terminals having a trough-like, longitudinally-extending, wire-receiving channel, a pair of coils wound on said stator core, each coil having at least one pair of lead wires extending therefrom, each said lead wire having a fixed end extending from a stator coil and a free end held by a clamp so that it extends alongside its associated said socket, said apparatus comprising:

means positioning said stator core and said clamps at a lead wire terminating station;

a terminal crimping member at said lead wire terminating station;

a pliers-like robot end effector operable to successively grip said lead wires intermediate their associated clamps and coils and to move said end effector to place successive ones of said lead wires into different ones of said channels;

said terminal crimping member including actuator means for causing said terminals to be crimped against said lead wires; and said end effector engaging said actuator means to cause said terminals to be crimped.

6. The apparatus of claim 5 wherein said terminal crimping member additionally includes means for cutting each of said lead wires immediately after its associated terminal is crimped.

* * * * *